United States Patent
Ahmed et al.

(10) Patent No.: US 11,933,930 B2
(45) Date of Patent: Mar. 19, 2024

(54) AUTOMATIC IMAGE REGISTRATION OF MULTICOMPONENT SEISMIC DATA

(71) Applicant: SAUDI ARABIAN OIL COMPANY, Dhahran (SA)

(72) Inventors: Ferhan Y. Ahmed, Dhahran (SA); Hongwei Liu, Dhahran (SA); Constantinos Tsingas, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 601 days.

(21) Appl. No.: 17/185,369

(22) Filed: Feb. 25, 2021

(65) Prior Publication Data
US 2022/0268958 A1 Aug. 25, 2022

(51) Int. Cl.
*G06K 9/00* (2022.01)
*G01V 1/30* (2006.01)
(Continued)

(52) U.S. Cl.
CPC .............. *G01V 1/50* (2013.01); *G01V 1/303* (2013.01); *G01V 1/362* (2013.01); *G06T 3/0068* (2013.01);
(Continued)

(58) Field of Classification Search
CPC .......... G01V 1/50; G01V 1/303; G01V 1/362; G01V 2210/52; G06T 7/337;
(Continued)

(56) References Cited

U.S. PATENT DOCUMENTS 8,255,166 B2 * 8/2012 Tonellot ................. G01V 11/00
702/16
9,784,863 B2 * 10/2017 Bansal .................... G01V 1/284
(Continued)

FOREIGN PATENT DOCUMENTS

CN 105445785 B 11/2017
CN 107167843 B 5/2019
(Continued)

OTHER PUBLICATIONS

International Search Report and Written Opinion issued in corresponding International Patent Application No. PCT/US2022/017989, dated May 20, 2022 (15 pages).
(Continued)

*Primary Examiner* — Avinash Yentrapati
(74) *Attorney, Agent, or Firm* — Osha Bergman Watanabe & Burton LLP

(57) ABSTRACT

A method is described that includes obtaining a multicomponent seismic data set for a subterranean region of interest and determining, using a computer processor, a PP stacked time-domain seismic image and a PS stacked time-domain seismic image from the multicomponent seismic data set. The method further includes transforming a recording-time axis of at least one of the PP stacked time-domain seismic image and the PS stacked time-domain seismic image to produce a pair of coarsely-registered PP and PS seismic images and filtering at least one of the pair to produce a pair of spectrally-matched PP and PS seismic images. Further, the method includes dynamically warping at least one of the pair of spectrally-matched PP and PS seismic images to produce a pair of fully-registered PP and PS seismic images.

20 Claims, 12 Drawing Sheets

(51) Int. Cl.
  *G01V 1/36* (2006.01)
  *G01V 1/50* (2006.01)
  *G06T 3/00* (2006.01)
  *G06T 7/20* (2017.01)
  *G06T 7/33* (2017.01)

(52) U.S. Cl.
  CPC .............. *G06T 3/0093* (2013.01); *G06T 7/20* (2013.01); *G06T 7/337* (2017.01); *G01V 2210/52* (2013.01); *G06T 2207/20024* (2013.01)

(58) Field of Classification Search
  CPC ....... G06T 3/0068; G06T 3/0093; G06T 7/20; G06T 2207/20024
  See application file for complete search history.

(56) References Cited

U.S. PATENT DOCUMENTS

| | | | |
|---|---|---|---|
| 2007/0081422 A1* | 4/2007 | Zou | G01V 1/286 367/73 |
| 2013/0144534 A1 | 6/2013 | Hilterman et al. | |
| 2016/0341835 A1* | 11/2016 | Guillaume | G01V 1/282 |
| 2018/0275303 A1 | 9/2018 | Zhan et al. | |
| 2020/0264330 A1 | 8/2020 | Etgen | |
| 2020/0271810 A1 | 8/2020 | Park | |

FOREIGN PATENT DOCUMENTS

| | | |
|---|---|---|
| EP | 1624321 B1 | 3/2007 |
| WO | 2016/001750 A2 | 1/2016 |
| WO | 2019204555 A1 | 10/2019 |

OTHER PUBLICATIONS

Dellinger, J. et al., "Wave-field separation in two-dimensional anisotropic media", Geophysics, vol. 55, No. 7, pp. 914-919, 1990 (6 pages).

Perelberg, Azik I. et al., "Applications of seismic polarization analysis", Geophysics, vol. 59, No. 1, pp. 119-130, 1994 (12 pages).

Yan, Jia et al., "Elastic wave-mode separation for VTI media", Geophysics, vol. 74, No. 5, pp. WB19-WB32, 2009 (14 pages).

Wang, Wenlong at al., "Comparson of two algorithms for isotropic elastic P and S vector decomposition", Geophysics, vol. 80, No. 4, pp. T147-T160, 2015 (15 pages).

Wang, Yanbin et al., "Separation of P- and SV-wavefields from multi-component seismic data in the t-p domain", Geophys. J. Int., vol. 151, pp. 663-672, 2002 (10 pages).

Stewart, Robert R. et al., "Converted-wave seismic exploration: Applications", Geophysics, vol. 68, No. 1, pp. 40-57, 2003 (18 pages).

Taner, M. T. et al., "Complex seismic trace analysis", Geophysics, vol. 44, No. 6, pp. 1041-1063, 1979 (23 pages).

S. Fomel et al. "A multistep approach to multicomponent seismic image registration with application to a West Texas carbonate reservoir study" 75th Annual International Meeting, SEG, Expanded Abstracts, 1018-1021; 2005 (5 pages).

S. Fomel et al. "Time-lapse image registration using the local similarity attribute" Geophysics, 74, No. 2, A7-A11; 2009 (5 pages).

D. Hale "Dynamic warping of seismic images" Geophysics, 78, No. 2, S105-S115; 2013 (12 pages).

J. E. Gaiser "Multicomponent VP/VS correlation analysis" Geophysics, 61, 1137-1149; 1996 (13 pages).

* cited by examiner

AUTOMATIC IMAGE REGISTRATION OF MULTICOMPONENT SEISMIC DATA

BACKGROUND

Seismic surveys are frequently conducted by participants in the oil and gas industry. Seismic surveys are conducted over subsurface regions of interest during the search for, and characterization of, hydrocarbon reservoirs. In seismic surveys, a seismic source generates seismic waves that propagate through the subterranean region of interest and are detected by seismic receivers. Typically, both seismic sources and seismic receivers are located on the Earth's surface. To acquire a seismic survey one or more seismic sources will be activated at a plurality of spatial locations distributed along a line, or over an area above the subterranean region of interest. The seismic receivers detect and store a time series of samples of earth motion caused by the seismic waves. A single time series of samples recorded by one seismic receiver or one directional component of ground motion is called a seismic "trace". A seismic receiver that detects and stores more than one directional component of ground motion is called a "multicomponent seismic receiver". For example, a multicomponent seismic receiver may record a vertical and two horizontal components of ground motion. Typically, the two horizontal components will be perpendicular to one another. For example, one horizontal component may be in a North-South direction and the other horizontal component in an East-West direction. Alternatively, one horizontal component may be oriented parallel to the line joining the location of the seismic source and seismic receiver, while the other horizontal component is oriented transverse to the line joining the location of the seismic source and seismic receiver.

Typically, the ground motion produced by a single activation of the seismic source is recorded by hundreds or thousands of seismic receivers. However, just as a seismic source is activated at a plurality different of spatial locations during the acquisition of a seismic survey, so each seismic receiver may also be repositioned at intervals during acquisition so as to never exceed a predetermined maximum spatial separation from the seismic source location. The collection of seismic traces recorded at many receiver locations generated by a seismic source at many source locations constitutes a "seismic data set".

To determine earth structure, including the presence of hydrocarbon reservoirs, the seismic data set may be processed. Processing a seismic data set includes a sequence of steps designed to: correct for near-surface effects; attenuate noise; compensate for irregularities in the seismic survey geometry; calculate a seismic velocity model; image reflectors in the subsurface; calculate a plurality of seismic attributes to characterize the subterranean region of interest; and aid in decisions governing if, and where, to drill for hydrocarbons such as oil and gas.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method including obtaining a multicomponent seismic data set for a subterranean region of interest and determining, using a computer processor, a PP stacked time-domain seismic image and a PS stacked time-domain seismic image from the multicomponent seismic data set. The method further includes transforming a recording-time axis of at least one of the PP stacked time-domain seismic image and the PS stacked time-domain seismic image to produce a pair of coarsely-registered PP and PS seismic images, and filtering at least one of the pair to produce a pair of spectrally-matched PP and PS seismic images. Further, the method includes dynamically warping at least one of the pair of spectrally-matched PP and PS seismic images to produce a pair of fully-registered PP and PS seismic images.

In general, in one aspect, embodiments relate to a non-transitory computer readable medium storing instructions executable by a computer processor, the instructions containing functionality for obtaining a multicomponent seismic data set for a subterranean region of interest and determining a PP stacked time-domain seismic image and a PS stacked time-domain seismic image from the multicomponent seismic data set. The instructions further contain functionality for transforming a recording-time axis of at least one of the PP stacked time-domain seismic image and the PS stacked time-domain seismic image to produce a pair of coarsely-registered PP and PS seismic images, and filtering at least one of the pair to produce a pair of spectrally-matched PP and PS seismic images. In addition, the instructions contain functionality for dynamically warping at least one of the pair of spectrally-matched PP and PS seismic images to produce a pair of fully-registered PP and PS seismic images.

In general, in one aspect, embodiments relate to a system for formation evaluation including a seismic source to emit a radiated seismic P-waves, a plurality of multicomponent seismic receivers for detecting and recording a multicomponent seismic data set generated by the radiated seismic P-waves, and a seismic processor. Furthermore, the seismic processor is configured to determine a PP stacked time-domain seismic image and a PS stacked time-domain seismic image from the multicomponent seismic data set. The method further includes transforming a recording-time axis of at least one of the PP stacked time-domain seismic image and the PS stacked time-domain seismic image to produce a pair of coarsely-registered PP and PS seismic images, and filtering at least one of the pair to produce a pair of spectrally-matched PP and PS seismic images. Further, the method includes dynamically warping at least one of the pair of spectrally-matched PP and PS seismic images to produce a pair of fully-registered PP and PS seismic images.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments disclosed herein relate to methods for comparing and combining seismic data containing predominantly reflected PP-waves with seismic data containing predominantly converted PS-waves. Reflected PP-waves and converted PS-waves are sensitive to different elastic properties of the subsurface. For example, subsurface formation boundaries may generate large converted PS-waves but small reflected PP-waves, or vice versa. In other cases, reflected PP-waves may be much more sensitive to the present of gas deposits than converted PS-waves. However, because the converted PS-waves from a subsurface formation boundary arrive much later in time than reflected PP-waves from the same boundary, comparing and combining them can be problematic and existing methods for correcting small time differences can fail when applied to these much large time differences.

Figure 1:
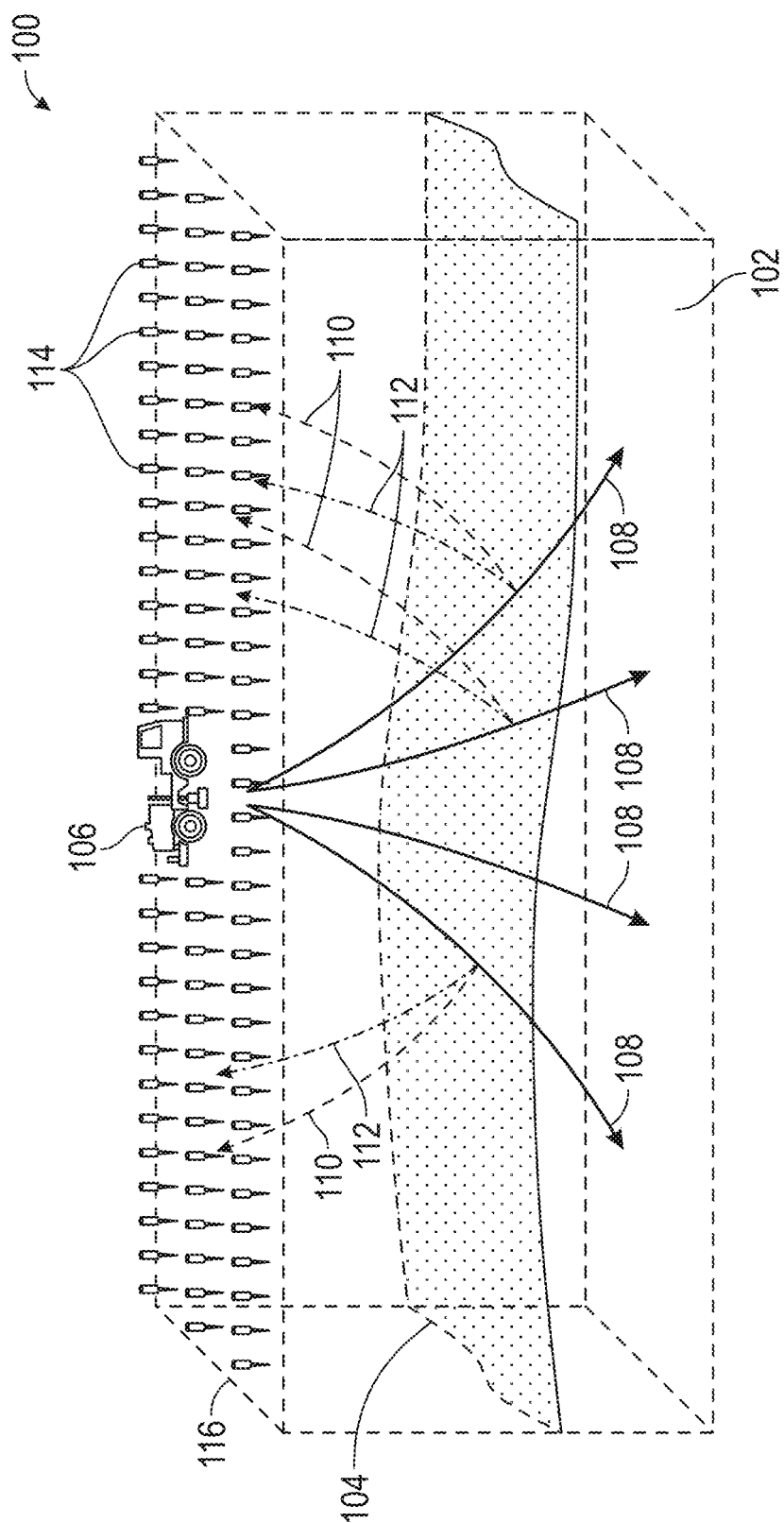
FIG. 1 depicts a seismic survey in accordance with one or more embodiments.

FIG. 1 shows a seismic survey (100) of a subterranean region of interest (102), which may contain at least one subsurface formation interface (104). The seismic survey (100) may utilize a seismic source (106) that generates radiated seismic P-waves (108). The seismic P-waves (which are sometimes referred to as pressure waves or compressional waves) may be reflected from subsurface formation interfaces (104) and return to the Earth's surface (116) as reflected seismic PP-waves (110). A reflected seismic PP-wave (110) propagates as a P-wave both before and after the reflection of the radiated seismic P-waves (108) at the subsurface formation interface (104)

Radiated seismic P-waves may also be reflected by the subsurface formation interface (104) as converted seismic PS-waves (112). Converted seismic PS-waves (112) propagate as seismic S-waves (which are sometimes referred to as shear waves or secondary waves) after reflection at the subsurface formation interface (104). The relative amplitudes of the reflected seismic PP-wave (110) and the converted seismic PS-wave (112) are determined by the angle at which the radiated seismic P-wave (108) is incident on the subsurface formation interface (104) and the density and elastic stiffnesses on either side of the subsurface formation interface (104). The relative amplitudes of the reflected seismic PP-wave (110) and the converted seismic PS-wave (112) are governed by the continuity of displacement and stress boundary conditions across the subsurface formation interface (104). Generally, if the radiated seismic P-wave (108) is incident on the subsurface formation interface (104) at a perpendicular angle only a reflected seismic PP-wave (112) will be created. However, at angles other than perpendicular, converted seismic PS-waves (112) and reflected seismic PP-waves must, typically, both be generated in order to satisfy the boundary conditions.

Reflected seismic PP-waves (110) and converted seismic PS-waves (112) both may be detected by multicomponent seismic receivers (114) at or near the earth's surface (116). Multicomponent seismic receivers (114) record the ground motion caused by both reflected seismic PP-waves (110) and by converted seismic PS-waves (112). Multicomponent seismic receivers (114) record the ground motion in a vertical direction and in one or two horizontal directions. Multicomponent seismic receivers (114) that record the ground motion in a vertical direction and two horizontal directions record two orthogonal horizontal directions. Reflected seismic PP-waves (110) generate ground motion predominately in the vertical direction. Converted seismic PS-waves (112) generate ground motion predominately in one or both of the orthogonal horizontal directions.

Figure 2:
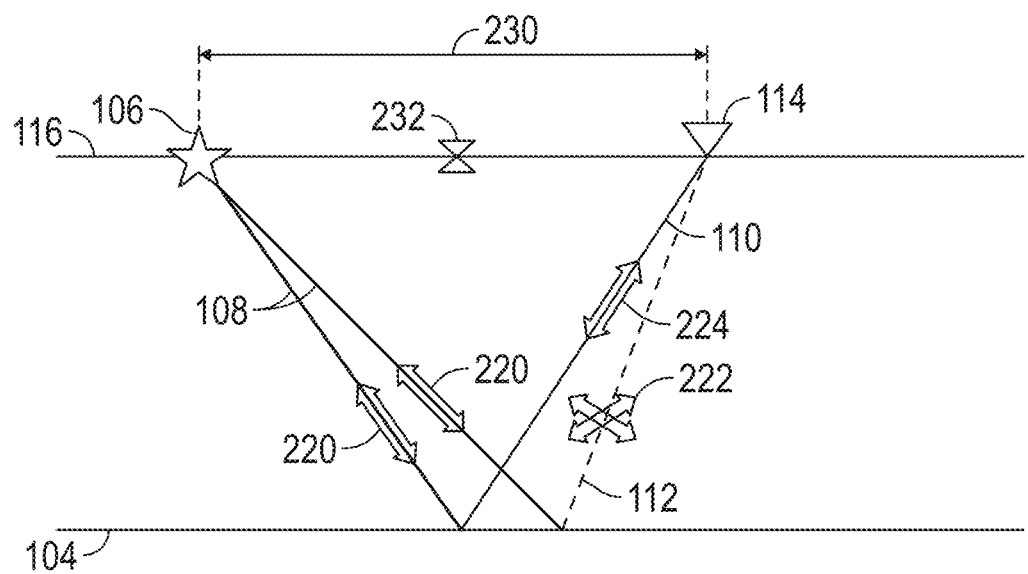
FIG. 2 shows PP and PS seismic signals in accordance with one or more embodiments.

FIG. 2 shows polarizations of radiated seismic P-waves (108) generated by a seismic source (106). Seismic P-waves have a polarization direction (220) oriented substantially in the direction of the seismic P-wave (108) propagation. Thus, radiated seismic P-waves (108) have polarizations (220) substantially parallel to the direction of the radiated seismic P-waves (108) propagation. Furthermore, reflected seismic PP-waves (110) have polarizations (224) substantially parallel to the direction of the reflected seismic P-waves (110) propagation. Converted seismic S-waves (112) have a polarization direction (222) oriented substantially perpendicular to the direction of the converted seismic PS-wave (112) propagation.

The propagation speed of seismic P-waves and seismic S-waves may vary at different positions within a subterranean region of interest (102). Although seismic S-waves at some locations, for example at deep locations, may propagate faster than seismic P-waves at other locations, for example at shallow locations, at any one position seismic P-waves (including radiated seismic P-waves (108) and reflected seismic PP-waves (210)), always propagate faster than seismic S-waves (including converted PS-waves (212)). Consequently, reflected seismic PP-waves (110) from a subsurface formation interface (104) will be detected by a multicomponent seismic receiver (114) earlier in time than converted seismic PS-waves (112) from the same subsurface formation interface (104) will be detected by the same multicomponent seismic receiver (114).

Reflected seismic PP-waves (110) may approach the Earth's surface (116) with a propagation direction close to vertical, and the polarization of reflected seismic PP-waves (224) will also be close to vertical. Consequently, the reflected seismic PP-waves (110) will be predominantly detected on the vertical component of the multicomponent seismic receiver (114). Converted seismic PS-waves (112) may also approach the Earth's surface (116) with a propagation direction close to vertical and the polarization of converted seismic PS-waves (222) close to the Earth's surface (116) may be close to horizontal. Consequently, the converted seismic PS-waves (112) will be predominantly detected on the horizontal components of the multicomponent seismic receiver (114).

A seismic data set typically includes recordings of seismic waves generated by a seismic source (106) from a plurality of positions, each recorded by an array of multicomponent seismic receivers (114) located at a plurality of positions. A seismic data set must be processed to generate a seismic velocity model of the subterranean region of interest (102) or an image of subsurface formation interfaces (104) within the subterranean region of interest (102).

Processing a seismic data set requires a sequence of steps designed, without limitation, to correct for near surface effects, attenuate noise, compensate for irregularities in the seismic survey geometry, calculate a seismic velocity model, image reflectors in the subsurface, calculate a plurality of seismic attributes to characterize the subterranean region of interest (102), and aid in decisions governing whether and where to drill for hydrocarbons, such as oil and gas. In addition, processing a seismic data set recorded with an array of multicomponent seismic receivers (114) requires the processing of reflected seismic PP-waves (110) and converted seismic PS waves (112).

In accordance with one or more embodiments, a seismic data set recorded with an array of multicomponent seismic receivers (114) may be divided into a PP-wave seismic data set and a PS seismic data set. The PP seismic data set may be calculated from the vertical components of the array of multicomponent seismic receivers (114) and the PS seismic data set may be calculated from the horizontal components of the array of multicomponent seismic receivers (114).

Figure 3:
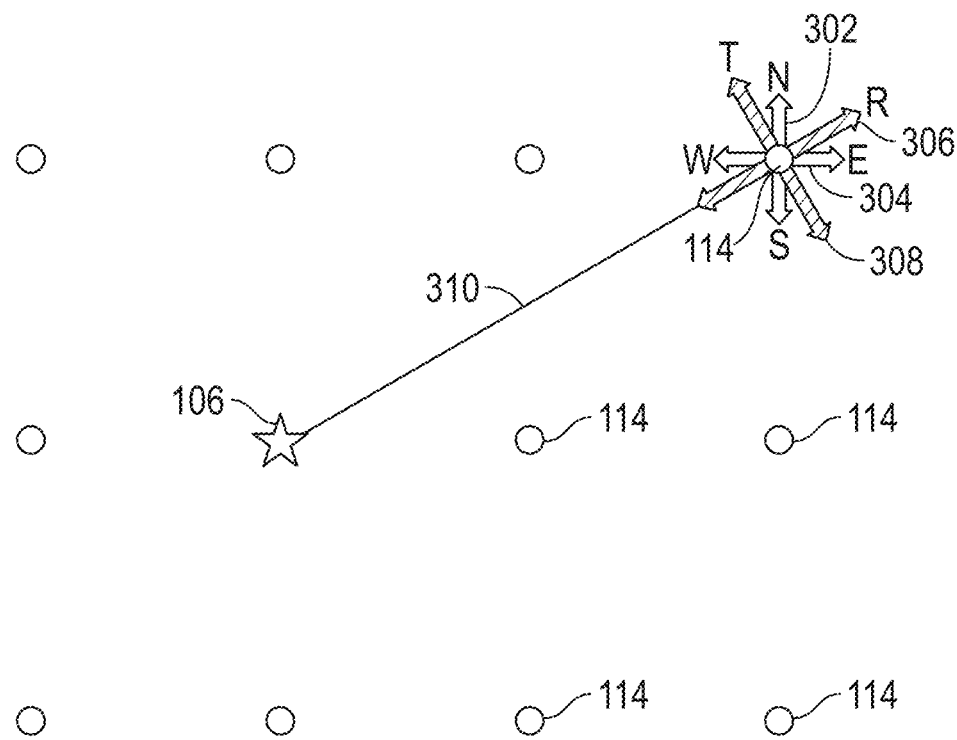
FIG. 3 shows coordinate systems in accordance with one or more embodiments.

FIG. 3 depicts a single seismic source (106) location and a plurality of multicomponent seismic receivers (114), in accordance with one or more embodiments. The two orthogonal horizontal components, such as the North-South component (302) and the East-West component (304), may be combined to produce a radial horizontal component (306) and a tangential horizontal component (308) for each multicomponent receiver (114). The radial horizontal component (306) is oriented parallel to the straight line (310) joining the position of the multicomponent seismic receiver (114) to the position of the seismic source (106), and a tangential horizontal component (308) is oriented perpendicular to the radial horizontal component (306) and perpendicular to the straight line (310) joining the position of the multicomponent seismic receiver (114) to the position of the seismic source (106). The PS seismic data set may be generated from the radial horizontal component for each of the multicomponent seismic receivers (114).

The PP seismic data set and PS seismic data set may by generated using other techniques including: using wave separation operators as described in "*Wave-field separation in two-dimensional anisotropic media*" 1990, Dellinger and Etgen, *Geophysics*, 55, 914-919; applying polarization analysis as described in "*Applications of seismic polarization analysis*" 1994, Perelberg and Hornbostel, *Geophysics*, 59, 119-130, or in "*Elastic wave-mode separation for VTI media*", 2009, Yan and Sava, *Geophysics*, 74 (5), WB19-WB32; by applying divergence and curl operators to reverse time-propagated multicomponent seismic data as described in "*Comparison of two algorithms for isotropic elastic P and S vector decomposition*", 2015, Wang, McMechan and Zhang, *Geophysics*, 80 (4), T147-T160; or by using radon transform methods, as described in "*Separation of P- and SV wavefields from multi-component seismic data in the τ-p domain*", 2002, Wang, Singh and Barton, *Geophys. J. Int*, 151, 663-672.

Figure 4A:
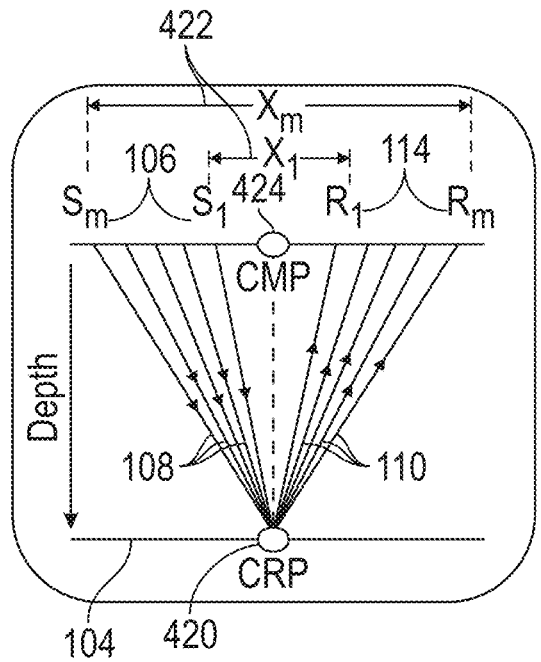
FIGS. 4A-4D depict steps in the processing of PP seismic signals in accordance with one or more embodiments.

In accordance with one or more embodiments, processing a PP seismic data set may include combining the seismic data recorded by a plurality of pairs of one seismic source (106) and one multicomponent seismic receiver (114). FIG. 4A depicts the radiated seismic P-waves (108) generated by a seismic source (106), at a plurality of locations denoted $S_i$, i=1,2, . . . ,m and reflected at a common reflection point "CRP" (420) as reflected seismic PP-waves (110) and recorded by a plurality of multicomponent seismic receivers (114), denoted $R_i$, i=1,2, . . . ,m. In accordance with one or more embodiments, the activation of the seismic source (106), at the location $S_i$, is separated by a sufficient interval in time from the activation of the seismic source (106), at the location $S_j$, j≠i that the reflected seismic PP-waves (110) generated and recorded by the seismic source (106) and multicomponent seismic receiver (114) pair ($S_j$, $R_j$) are not corrupted by reflected seismic PP-waves (110) generated by other seismic sources $S_i$, i≠j, j=1,2, . . . ,m.

The horizontal separation between a pair, ($S_i$, $R_i$), of seismic source (106) and multicomponent seismic receiver (114) is known as the "offset" (422), and the pair, ($S_i$, $R_i$), of seismic source (106) and multicomponent seismic receiver (114) may be symmetrically disposed on either side of a common mid-point (CMP) (424).

Figure 4B:
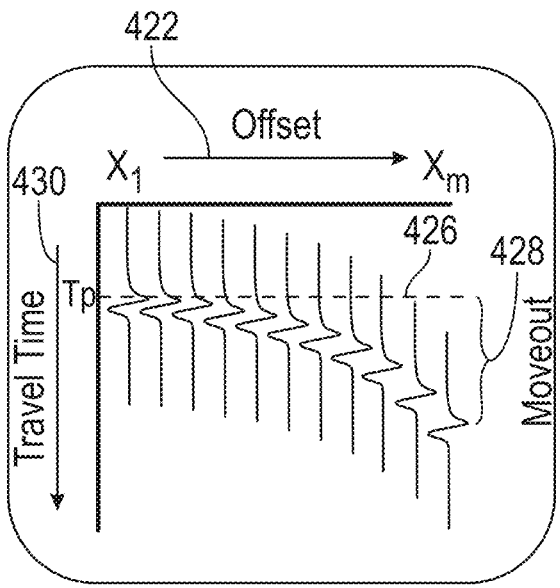

In FIG. 4B the travel time (430) of reflected seismic PP-waves (110) reflected at the same CRP (420) on the same subsurface formation interface (104) will be greater for a seismic source (106) and multicomponent seismic receiver (114) pair with a larger offset (422) than for a seismic source (106) and multicomponent seismic receiver (114) pair with a smaller offset (422). This increase in travel time (430) of reflected seismic PP-waves (110) for seismic source (106) and multicomponent seismic receiver (114) pairs with greater offsets (422) is known as "moveout" (428). The moveout of travel times with increasing offset (422) means reflected seismic PP-waves (110) will arrive at the multicomponent seismic receivers (114) at large offsets later than the time, denoted $T_p$, (426) at which the converted seismic PP-waves (110) arrive at zero offset, as depicted in FIG. 4B.

Figure 4C:
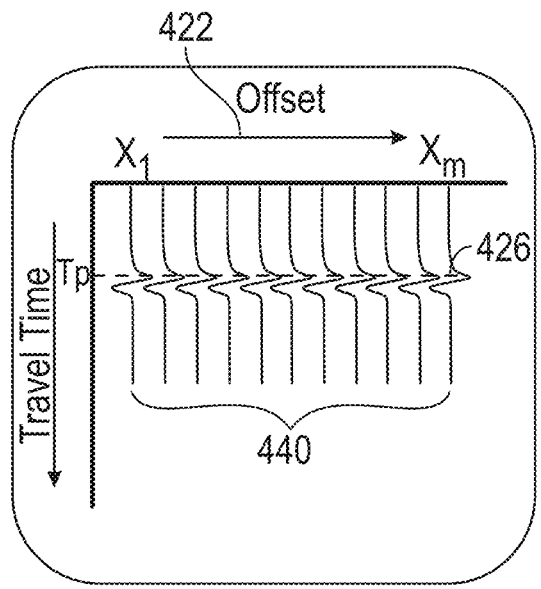

In accordance with one or more embodiments, before combining the reflected seismic PP-waves (110) recorded by pairs of seismic sources (306) and multicomponent seismic receivers (114) with different offsets (422) but the same CMP (424), the different travel times (430) may be corrected for as shown in FIG. 4C. The PP seismic data set generated by this correction may be denoted a "moveout corrected" PP seismic data set (440). This correction may be performed, according to one or more embodiments, by calculating the travel time of reflected seismic PP-waves (110) for different estimates of the seismic wave propagation P-wave velocity, denoted Vp, in the subterranean region of interest. The estimate of Vp in the subterranean region of interest may vary only with depth below the Earth's surface or may vary with both depth and one or more horizontal positions. Vp may be estimated iteratively until an estimate that causes the peaks of the reflected seismic PP-waves for all offsets to align at the same time value is found. The iterative estimation of Vp may be performed by a trial-and-error method or by an inversion method. This process of estimating Vp by aligning the arrival times (430) of reflected PP-waves from different offsets (422) is called "moveout correction velocity analysis". The iterative estimation of Vp may be performed, according to one or more embodiments, by performing seismic migration velocity analysis.

Figure 4D:
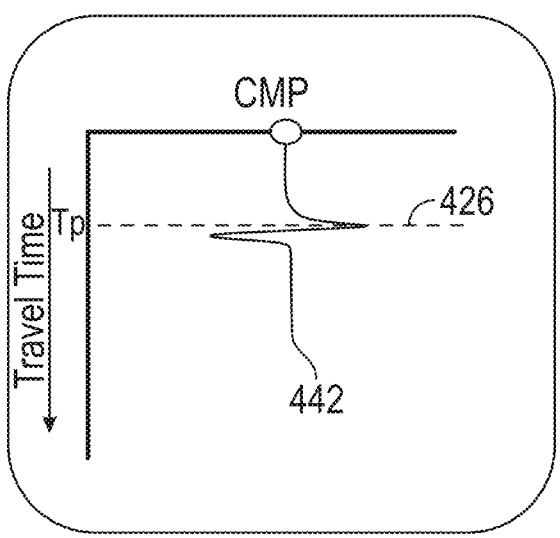

In accordance with one or more embodiments, as depicted in FIG. 4D the moveout-corrected PP seismic data (440) set may be combined to generate a single stacked PP seismic data trace (442) for each CMP (424). This process of combination is called "stacking" and involves the summation of moveout corrected PP seismic data (440) from a plurality of offsets. In accordance with other embodiments stacking may comprise calculating an average of corrected PP seismic data (440) from a plurality of offsets, wherein an average may mean calculating a mean, a trimmed-mean, or a weighted mean of the values of a time sample from each of a plurality of offsets (422). Other methods of stacking are familiar to those of ordinary skill in the art.

Figure 5A:
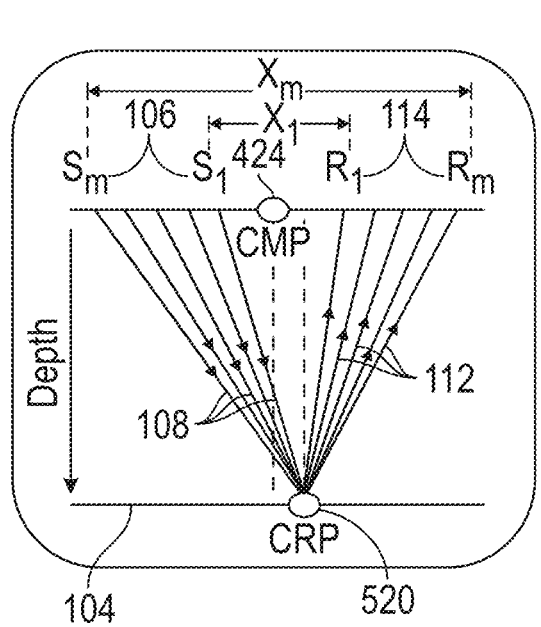
FIGS. 5A-5D depict steps in the processing of PS seismic signals in accordance with one or more embodiments.

In accordance with one or more embodiments, processing a PS seismic data set may include combining the seismic data recorded by a plurality of pairs of seismic sources (106) and multicomponent seismic receivers (114). FIG. 5A depicts the radiated P-waves (108) generated by a plurality of seismic sources (106) and reflected at a common reflection point (520) as converted seismic PS-waves (112) and recorded by a plurality of multicomponent seismic receivers (114).

Figure 5B:
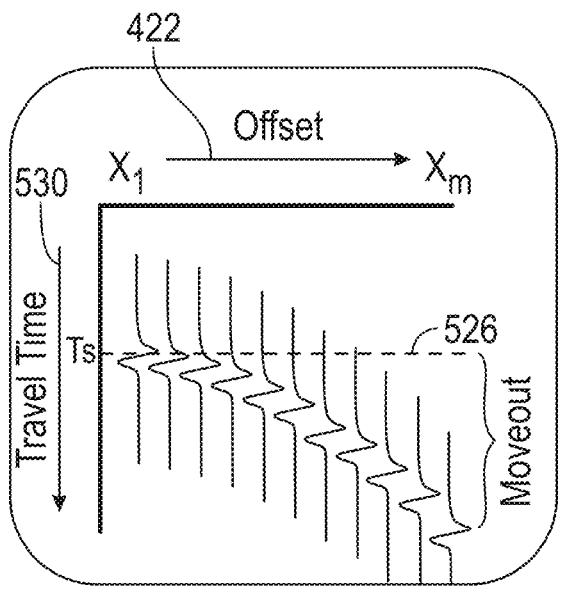

FIG. 5B depicts the travel time (530) of converted seismic PS-waves (112) reflected at the same common refection point (520) on the same subsurface formation interface (104). The travel time (530) is greater for a seismic source (106) and multicomponent seismic receiver (114) pair with a larger offset (422) than for a seismic source (106) and multicomponent seismic receiver (114) pair with a smaller offset (422). The moveout of travel times with increasing offset (422) means converted seismic PS-waves (112) will arrive later at large offsets than the time, denoted $T_S$, (526) at which the converted seismic PS-waves (112) may arrive at zero offset, as shown in FIG. 5B. Converted seismic PS-waves (112) propagate more slowly than reflected seismic PP-waves at any point in the subterranean region. Consequently, $T_S$ (526) is typically larger than $T_P$ (426). $T_S$ (526) is usually two or three times as large as $T_P$ (426).

Figure 5C:
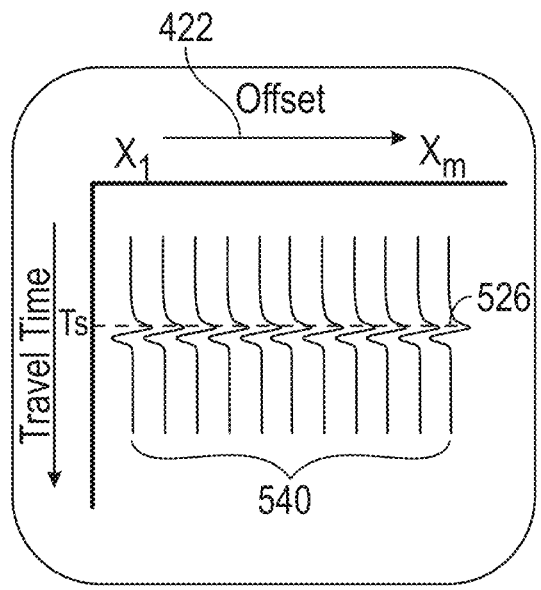

Before combining the converted seismic PS-waves (112) recorded at different offsets (422), the different travel times (530) must first be corrected, as shown in FIG. 5C. The PS seismic data set generated by this correction may be called a "moveout-corrected PS seismic data set". This correction may be performed using the same methods described above for calculating a moveout-corrected PP seismic data set, except in this case Vs in the subterranean region of interest (102) is used rather than Vp.

Figure 5D:
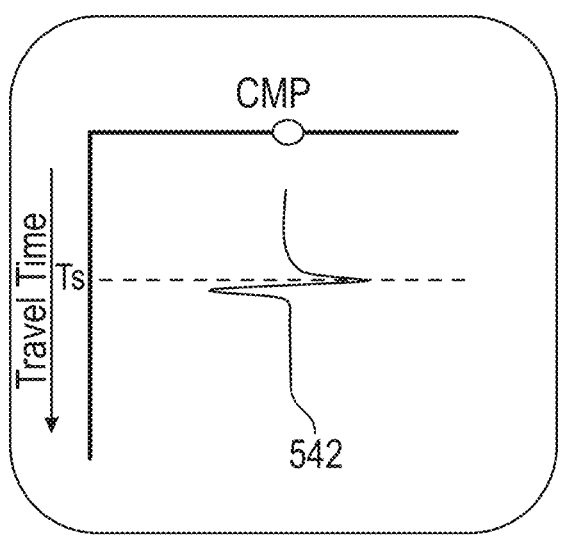

In accordance with one or more embodiments, as depicted in FIG. 5D the moveout corrected PS seismic data set (540) may be combined to generate a single PS seismic data trace (542) for each CMP (424). The same methods of stacking described previously for combining moveout corrected PP seismic data (440) may be used to combine the moveout corrected PS seismic data set (540).

Figure 6B:
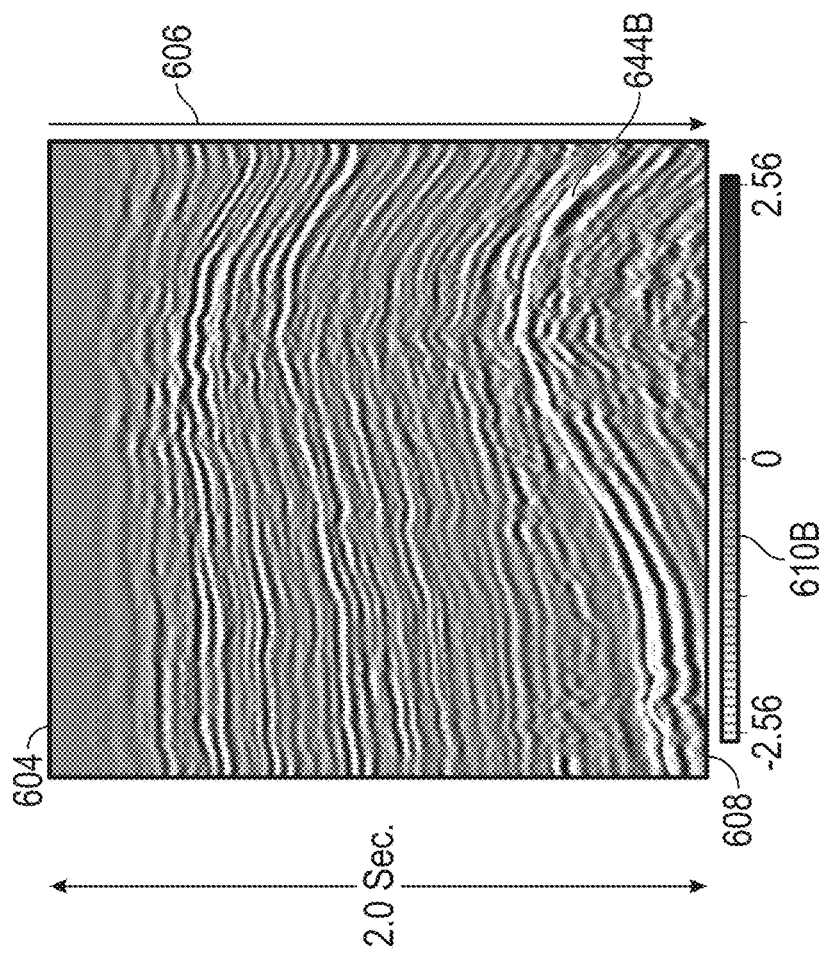
FIGS. 6A and 6B show a comparison of PP and PS time-domain stacked seismic sections, in accordance with one or more embodiments.
Figure 6A:
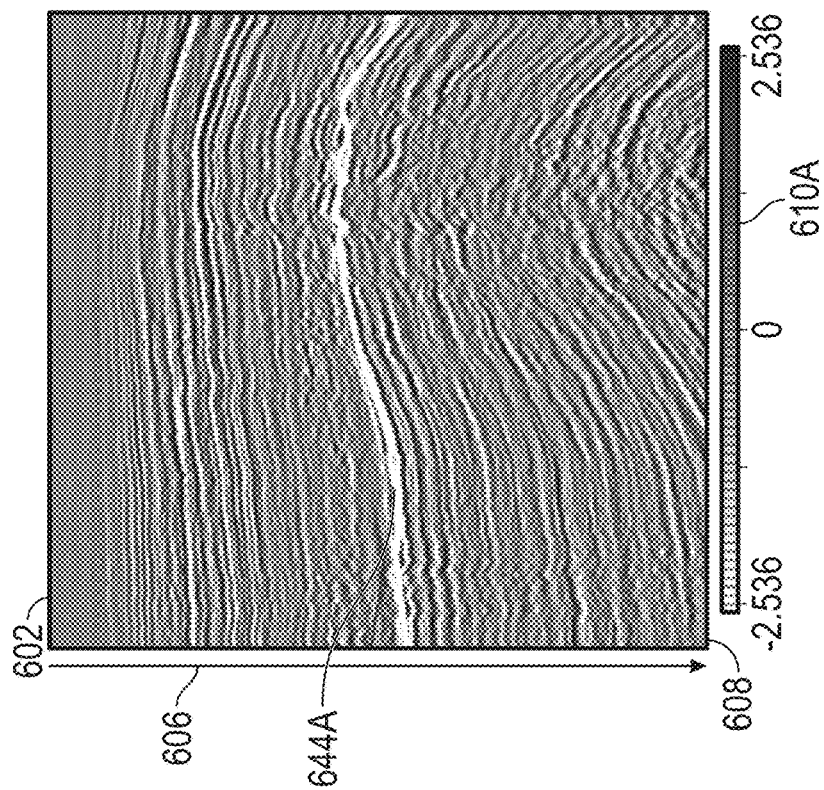

FIG. 6A shows, in accordance with one or more embodiments, a PP stacked time-domain seismic image (602). The PP stacked time-domain seismic image (602) is composed of a plurality of stacked seismic PP data traces (442) corresponding to adjacent CMPs (424). FIG. 6B shows a PS stacked time-domain seismic image (604) composed of a plurality of seismic PS data traces (542) corresponding to a plurality CMPs (424). The vertical axis (606) of FIG. 6A and the vertical axis (606) of FIG. 4B both indicate travel time. The horizontal axis (608) of FIG. 6A and the horizontal axis (608) of FIG. 6B both indicate the location of each CMP (424). The grayscale (610A) shows the amplitude of the PP stacked time-domain seismic image (602) at each time and CMP location. The grayscale (610B) shows the amplitude of the PS stacked time-domain seismic image (604) at each time and CMP location.

In FIG. 6A the reflected seismic PP-waves from an example subterranean formation boundary are marked with the continuous line (644A) running form the left to the right of FIG. 6A. In FIG. 6B the converted seismic PS-waves from the same exemplary subterranean formation boundary are marked with the continuous line (644B) running form the left to the right of FIG. 4B. FIG. 6A contains reflected seismic PP-waves from many subterranean formation boundaries. Similarly, FIG. 6B contains converted seismic PS-waves from many subterranean formation boundaries. The travel times (644B) of the converted seismic PS-waves are much larger than the travel times (644A) of the reflected seismic PP-waves (110). This difference is a result of the lower propagation velocities of seismic S-waves than the propagation velocities of seismic P-waves.

Figure 7:
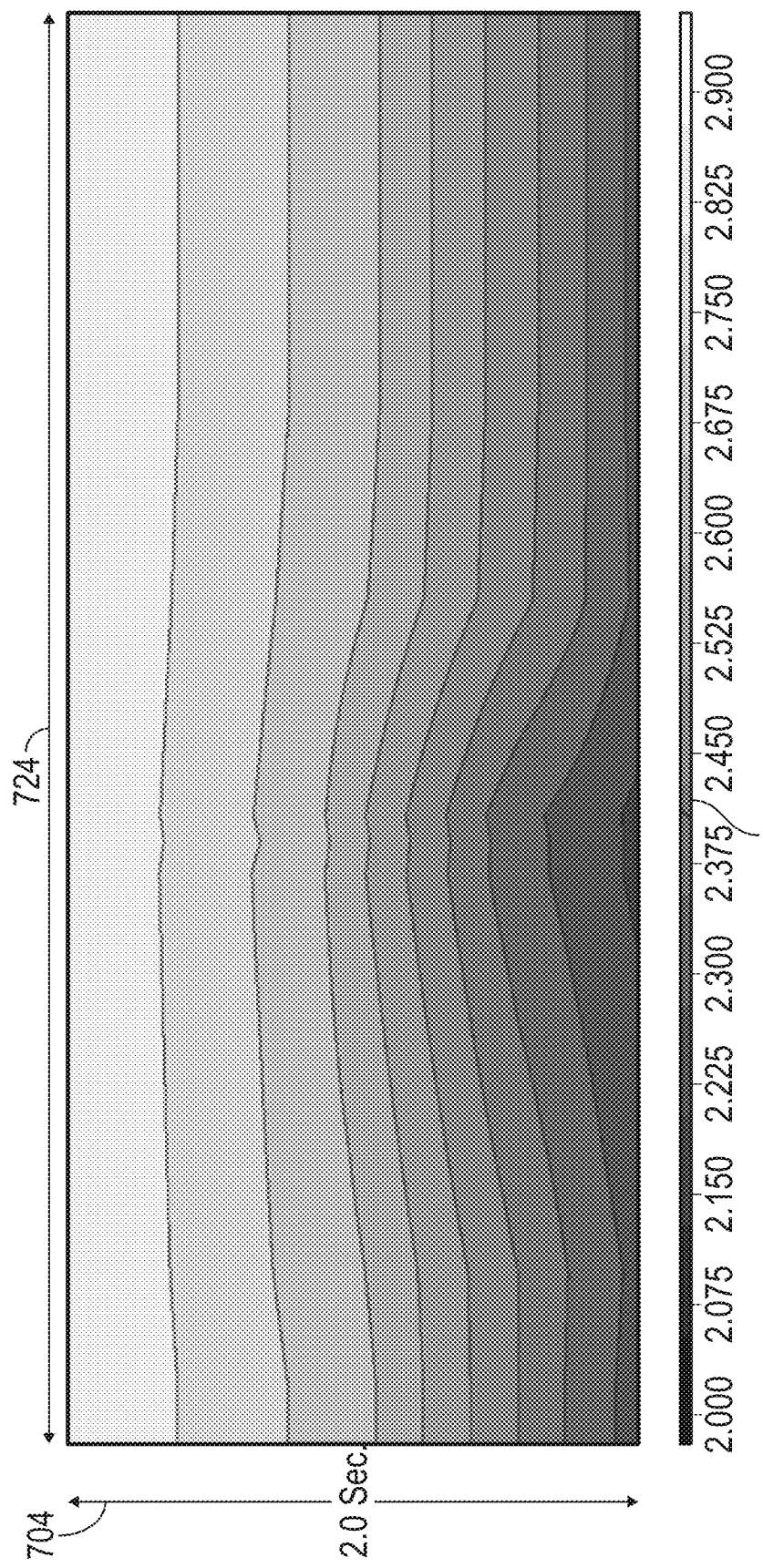
FIG. 7 shows a ratio of compressional to shear seismic wave propagation speed for a cross-section of a subterranean region of interest in accordance with one or more embodiments

FIG. 7 displays the ratio of Vp to Vs, denoted γ, for a plurality of CMP positions (424) and travel time (604) for reflected seismic PP-waves (110). Vp and Vs may, according to one or more embodiments, have been calculated using seismic migration velocity analysis. The value of γ for each travel time (704) and CMP position (724) is displayed as a grayscale (706). FIG. 7 is a two-dimensional cross-section through a three-dimensional cube, wherein the third axis of the three-dimensional cube is orthogonal to the CMP position axis (724) displayed. FIG. 7 shows the value of γ varies with travel time (704), or equivalently depth, and with CMP position (724). Typically, γ will also vary along the horizontal axis orthogonal to the CMP position axis.

In accordance with other embodiments, the value of γ may be selected from empirical relationships well known to one of ordinary skill in the art and available in the geological literature, or the value of γ may be selected based on trial and error. According to still other embodiments value of γ may be selected from borehole sonic logs recorded in a borehole penetrating the subterranean region of interest, or borehole penetrating adjacent subterranean regions.

FIG. 8A shows the same PP stacked time-domain seismic image (602) depicted in FIG. 6A and FIG. 8B shows the same PS stacked time-domain seismic image (604) depicted in FIG. 6B, in accordance with one or more embodiments. Further, FIG. 8C shows the PS stacked time-domain seismic image with a compressed travel time axis (806), in accordance with one or more embodiment. The compressed travel time (806), denoted $\tilde{T}_P$, may be calculated as:

$$\tilde{T}_{PS} = \frac{2}{(\gamma + 1)} T_s \qquad \text{Equation (1)}$$

In accordance with one or more embodiments, compressing the travel time axis of the PS stacked time-domain seismic image (604) may approximately align the travel times of converted seismic PS-waves in the PS stacked time-domain seismic image (606) with the travel times of reflected seismic PP-waves in the PP stacked time-domain seismic image (602). The PP stacked time-domain seismic image (602) in FIG. 8A and the PS stacked a time-domain seismic image with a compressed travel time axis (606) in FIG. 8B may be called a pair of coarsely-registered stacked time-domain seismic images.

In accordance with other embodiments, the travel time axis of the PP stacked time-domain seismic image (602) may be expanded to approximately align the travel times of reflected seismic PP-waves in the PP stacked time-domain seismic image (602) with the travel times of converted seismic PS-waves in the PS stacked time-domain seismic image (604). The expanded travel time, denoted $\tilde{T}_{SP}$, may be calculated as:

$$\tilde{T}_{SP} = \frac{(\gamma+1)}{2} T_P \qquad \text{Equation (2)}$$

In still further embodiments the travel time axes of both the PP stacked time-domain seismic image (602) and the PS stacked time-domain seismic image (604) may be expanded and compressed to align the travel times of reflected seismic PP-waves and the travel times of converted seismic PS-waves, to produce a pair of coarsely-registered stacked time-domain seismic images.

In accordance with one or more embodiments, in the pair of coarsely-registered stacked time-domain seismic images (602, 606) the travel times of reflected seismic PP-waves and the travel times of converted seismic PS-waves coming from the same subterranean formation interface are approximately equal. For example, a reflected seismic PP-wave is highlighted (810A) in the PP stacked time-domain seismic image (602), the corresponding converted seismic PS-wave (112) is highlighted (810B) in the PS stacked time-domain seismic image (604), and the corresponding converted seismic PS-wave is highlighted (810C) in the PS stacked time-domain seismic image with a compressed travel time axis (606).

In accordance with one or more embodiments, the pair of coarsely-registered stacked time-domain seismic images (602, 606) may be filtered. The filtering may be spectral balancing and produce a pair of spectrally-matched PP and PS seismic images. Each member of the pair of spectrally-matched PP and PS seismic images has spectra which are, at least approximately, similar to the spectra of the other member. The filtering may include, calculating a set of non-stationary spectra for each of the pair of coarsely-registered PP and PS stacked time-domain seismic images and determining a ratio of the non-stationary spectra of both the PP member and the PS member of the pair of coarsely-registered PP and PS stacked time-domain seismic images. The filtering may further include normalizing at least one of the sets of non-stationary spectra of the pair of coarsely-registered PP and PS stacked time-domain seismic images using the ratio of the set of non-stationary spectra.

In accordance with one or more embodiments, the filtering may be done in the time-domain or may involve transforming one or both of the coarsely-registered time-domain seismic images (602, 606) into the frequency-domain, performing the filtering in the frequency-domain, and inverse-transforming the frequency-domain seismic images back to the time-domain. Matching may be done globally, by applying a single filter derived over a portion of the seismic data set to then entire seismic data set. Alternatively, matching may be done locally, by applying a filter calculated on a portion of the seismic data set to the same portion of the seismic data set.

In accordance with one or more embodiments, the transformation of the non-stationary spectra may be performed using one or many methods familiar to one of ordinary skill in the art. These methods may include, without limitation, a Fourier Transform, Short-time Discrete Fourier Transform, a Gabor Transform, a Stockwell Transform, a Continuous-Wavelet Transform, a Discrete-Wavelet Transform, a Matching pursuit transform, an Empirical Mode Decomposition, a Wigner-Ville distribution, and a synchro-squeezing Transform.

In accordance with one or more embodiments, the spectral balancing filter may be calculated using a Least-Squares (LSQ) filter, denoted $F^{LSQ}$. If $\widetilde{PP}$ and $\widetilde{PS}$ are the spectra of the PP and PS members of the pair of coarsely-registered stacked time-domain seismic images (602, 606), then $F^{LSQ}$ is the filter F that minimizes $\langle|\widetilde{PP}-F\widetilde{PS}|^2\rangle$, where the braces, $\langle x \rangle$, denote the mean of the argument x over at least a portion of the pair of coarsely-registered time-domain seismic images (602, 606). $F^{LSQ}$ may be written as:

$$F^{LSQ} = \langle \widetilde{*PS}\ \widetilde{PP}* \rangle / (\langle \widetilde{PS}\ \widetilde{*PS}* \rangle + \varepsilon^2) \qquad \text{Equation (3)}$$

where ε is a stabilization, or Weiner noise parameter, and the superscript * denotes complex-conjugation.

In accordance with one or more embodiments, a spectral balancing filter may be defined with the same phase spectra as $F^{LSQ}$ but an amplitude response given by $$\sqrt{\langle \widetilde{PP}*\widetilde{PP}\rangle / \langle \widetilde{PS}*\widetilde{PS}^*\rangle}.$$

According to other embodiments a pair of spectral balancing filters may be designed, where:

$$F_{PP} = S / \sqrt{\langle \widetilde{PP}*\widetilde{PP}^*\rangle} \text{ and} \qquad \text{Equation (4)}$$

$$F_{PS} = S\langle \widetilde{PP}*\widetilde{PS}^*\rangle / [|\langle \widetilde{PP}*\widetilde{PS}^*\rangle\langle \widetilde{PS}*\widetilde{PS}^*\rangle|]. \qquad \text{Equation (5)}$$

The filter $F_{PP}$ may then be applied to the PP member of the pair of coarsely-registered time-domain seismic images (602), and the filter $F_{PS}$ may then be applied to the PS member of the pair of coarsely-registered time-domain seismic images (606) to generate a pair of spectrally-matched PP and PS seismic images.

Figure 9:
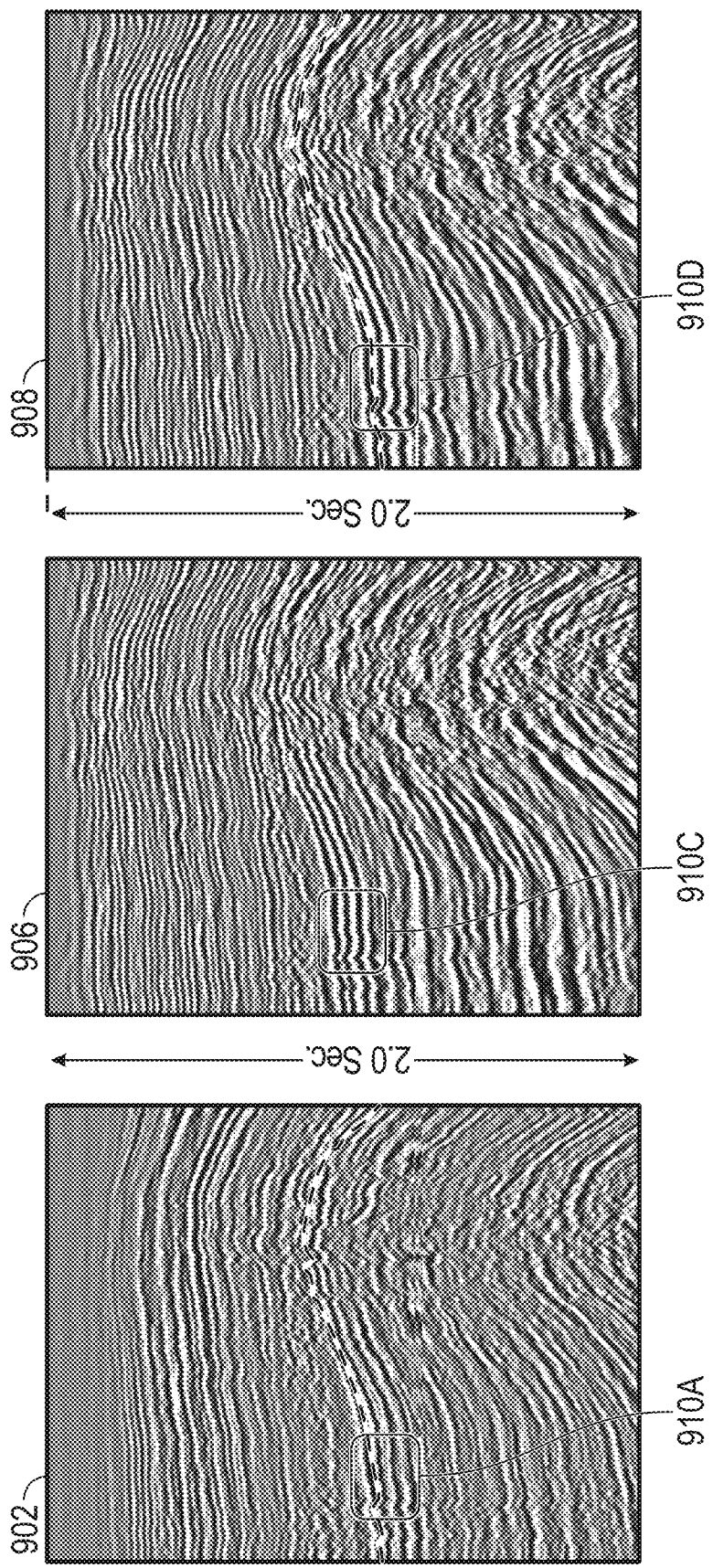
FIGS. 9A-9C show time-domain stacked seismic sections in accordance with one or more embodiments.

In accordance with one or more embodiments, as shown in FIG. 9, a dynamic warping may be applied to a pair of spectrally-matched PP and PS seismic images (902, 906) to generate a pair of fully-registered time-domain PP and PS seismic images (902, 908). According to one or more embodiments, the dynamic warping may be performed using the algorithm described in "Time-lapse image registration using the local similarity attribute", Fomel and Jin, 2009, Geophysics, Vol. 74, No. 2, pages A7-A11.

The dynamic warping may be implemented as a windowed cross-correlation between a seismic data trace corresponding to the same CMP in each member of the pair of spectrally-matched PP and PS seismic images. In accordance with one or more embodiments, a local similarity measure $w_t$ may be defined as $w_t = p_t q_t$ for each time sample of a seismic data trace corresponding to the same CMP in each member of the pair of spectrally-matched PP and PS seismic images. The functions $p_t$ and $q_t$ are defined as the solutions to:

$$\min_{p_t} \sum_{-\tau_0}^{\tau_0} (a(t-\tau) - p_t(\tau)b(t-\tau))^2 + R[p_t] \text{ and} \quad \text{Equation (6)}$$

$$\min_{p_t} \sum_{-\tau_0}^{\tau_0} (b(t-\tau) - q_t(\tau)a(t-\tau))^2 + R[q_t] \quad \text{Equation (7)}$$

where a(t) and b(t) are one seismic data trace from the PP and PS members of the pair of spectrally-matched PP and PS seismic images corresponding to the same CMP, $\tau_0$ defines a window of times samples and R is a regularization operator designed to enforce a desired behavior such as smoothness. In accordance with one or more embodiments, R may be a shaping regularization to enforce smoothness in iterative optimization solution of equations (6) and (7).

In accordance with one or more embodiments, the application of local similarity to the time-lapse image-registration problem includes squeezing and stretching the pair of spectrally-matched PP and PS seismic images with respect to one another. The warping function $w_t$ matches the pair of spectrally-matched PP and PS seismic images to generate a pair of fully-registered time-domain PP and PS seismic images (902, 908). The derivative of the local similarity measure, $w_t$, provides an estimate of the local ratio of the velocities:

$$\frac{dw_t}{dt} \approx \frac{\tilde{v}_{PP}(t)}{\tilde{v}_{PS}(t)} \quad \text{Equation (8)}$$

where $\tilde{v}_{PP}(t)$ and $\tilde{v}_{PS}(t)$ are the effective seismic propagation velocities corresponding to each member of the pair of spectrally-matched PP and PS seismic images, respectively.

FIGS. 9A and 9C show, in accordance with one or more embodiments, an example of a pair of fully-registered time-domain PP and PS seismic images (902, 908) and FIG. 9B shows the PS member of the pair of spectrally-matched PP and PS seismic images (906). An example of a reflected seismic PP-wave is highlighted (910A) in the fully-registered stacked time-domain PP seismic image (902), the corresponding converted seismic PS-wave is highlighted (910C) in the PS member of the pair of spectrally-matched seismic image (906), and the corresponding converted seismic PS-wave is highlighted (910D) in the fully-registered stacked time-domain PP seismic image (908). It is readily apparent to one of ordinary skill in the art that the reflected seismic PP-wave and the converted seismic PS-wave are better aligned in time in the pair of fully-registered time-domain PP and PS seismic images (902, 908) than in the spectrally-matched PS seismic image (906).

Figure 10:
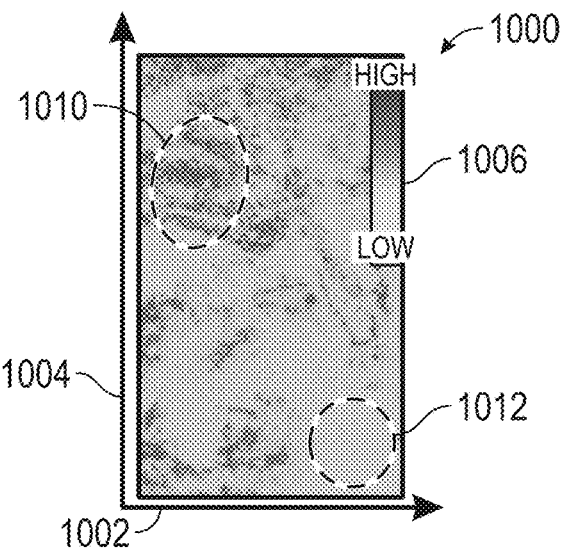
FIG. 10 shows a seismic attribute map in accordance with one or more embodiments.

In accordance with one or more embodiments, the fully-registered time-domain PP and PS seismic images (902, 908) may be combined to generate seismic attribute maps for depths of interest. Such a map (1000) is shown in FIG. 10. The seismic attribute may be the ratio between the amplitudes of the PP and PS members of the fully-registered time-domain PP and PS seismic images (902, 908). Alternatively, the seismic attribute may be the product or the difference between the amplitudes of the PP and PS members of the fully-registered time-domain PP and PS seismic images (902, 908). Many other seismic attributes, that may be generated from the pair of fully-registered time-domain PP and PS seismic images (902, 908), are familiar to one of ordinary skill in the art.

FIG. 10 shows an example of a seismic attribute map, according to one or more embodiments. The abscissa, or "x" axis (1002) may be the East-West direction and the ordinate, or "y", axis (1004) may be the North-South direction, although other choices of perpendicular axes may be used. The grayscale (1006) indicates the value of the seismic attribute for each pixel on the seismic attribute map (1000). In accordance with one or more embodiments, areas of the seismic attribute map (1000) that show high values of the seismic attribute, such as the area enclosed by the ellipse (1010), may be interpreted to have a high likelihood of containing hydrocarbons and make a promising target for drilling. In other embodiments, areas of the seismic attribute map (1000) that contain low values of the seismic attribute, such as the area enclosed by the ellipse (1012), may be interpreted to have a high likelihood of containing hydrocarbons and make a promising target for drilling.

The seismic attribute map (1000) may indicate areas, such as the ellipses (1010, 1012) with a high probability of containing hydrocarbons. However, the seismic attribute map (1000) only displays values of the attribute at a single depth and it may be necessary to combine maps for a plurality of adjacent depths to determine promising drilling targets. In addition, it may be difficult or impossible to penetrate all the promising targets within an area (1010, 1012) by drilling a single vertical borehole, or indeed, a single straight borehole at a deviated angle. In these cases, it may be advantageous to drill a borehole with a curved borehole path based, at least in part, on one or more seismic attribute depths (1000) at a plurality of adjacent depths. Drilling a single borehole with a curved borehole path may allow the borehole to penetrate a plurality of promising targets. Drilling a borehole with a curved borehole path may be based solely upon a seismic attribute map, but more commonly the curved borehole path may be modified during the drilling of the borehole based, at least in part, upon measurements made by sensor located close to the current bottom of the borehole. This process of modifying the borehole in real-time during drilling based on measurements made near the current bottom of the borehole is known as geosteering.

Figure 11:
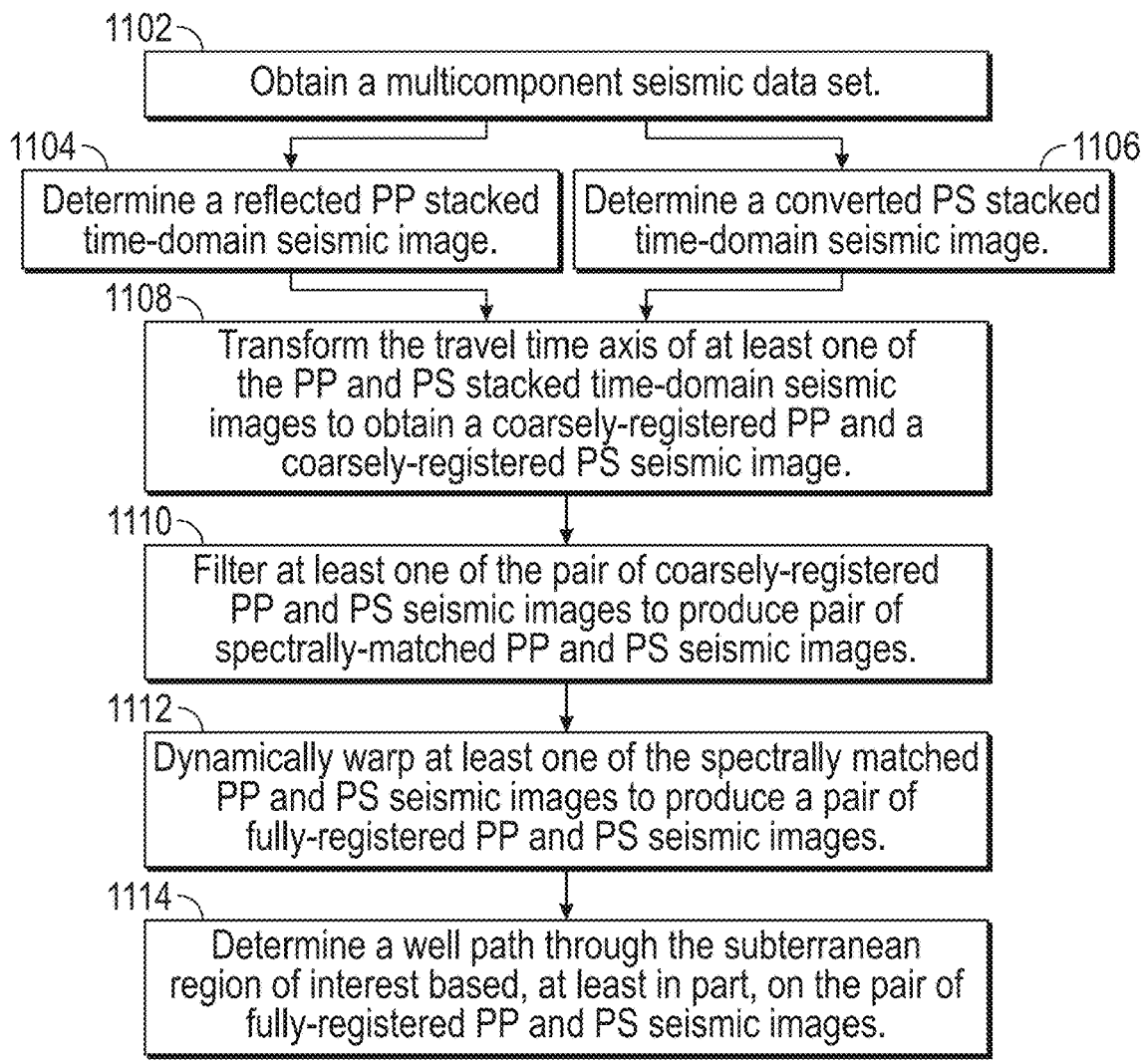
FIG. 11 shows a flowchart in accordance with one or more embodiments.

FIG. 11 shows a flow chart in accordance with one or more embodiments. In Step 1102 a multicomponent seismic data set for a subterranean region of interest is obtained. The multicomponent seismic data set may comprise a recording of a vertical component of ground motion and at least one horizontal component of ground motion in response to a seismic source (106) located on the earth's surface (116). The vertical component of ground motion and the at least one horizontal component of ground motion may be detected and recorded by a multicomponent seismic receiver (114). Alternatively, the vertical component of ground motion and the at least one component of horizontal motion may be recorded by two separate sensors, each of which record only a single component of ground motion, and which are located in close proximity with one another.

In Step 1104, a reflected PP stacked time-domain seismic image (602) may be determined from the multicomponent seismic dataset. The reflected PP stacked time-domain seismic image (602) may be determined solely from recordings of the vertical component of ground motion. Alternatively, the reflected PP stacked time-domain seismic image (602)

may be determined by polarization analysis, or by calculating the divergence of the propagating PP-waves (110) and converted PS-waves (112).

In Step 1106, a converted PS stacked time-domain seismic image (604) may be determined from the multicomponent seismic dataset. The converted PS stacked time-domain seismic image (604) may be determined solely from recordings of horizontal component of ground motion. Alternatively, the converted PS stacked time-domain seismic image (604) may be determined by polarization analysis, or by calculating the curl of the propagating PP-waves (110) and converted PS-waves (112).

Figure 8:
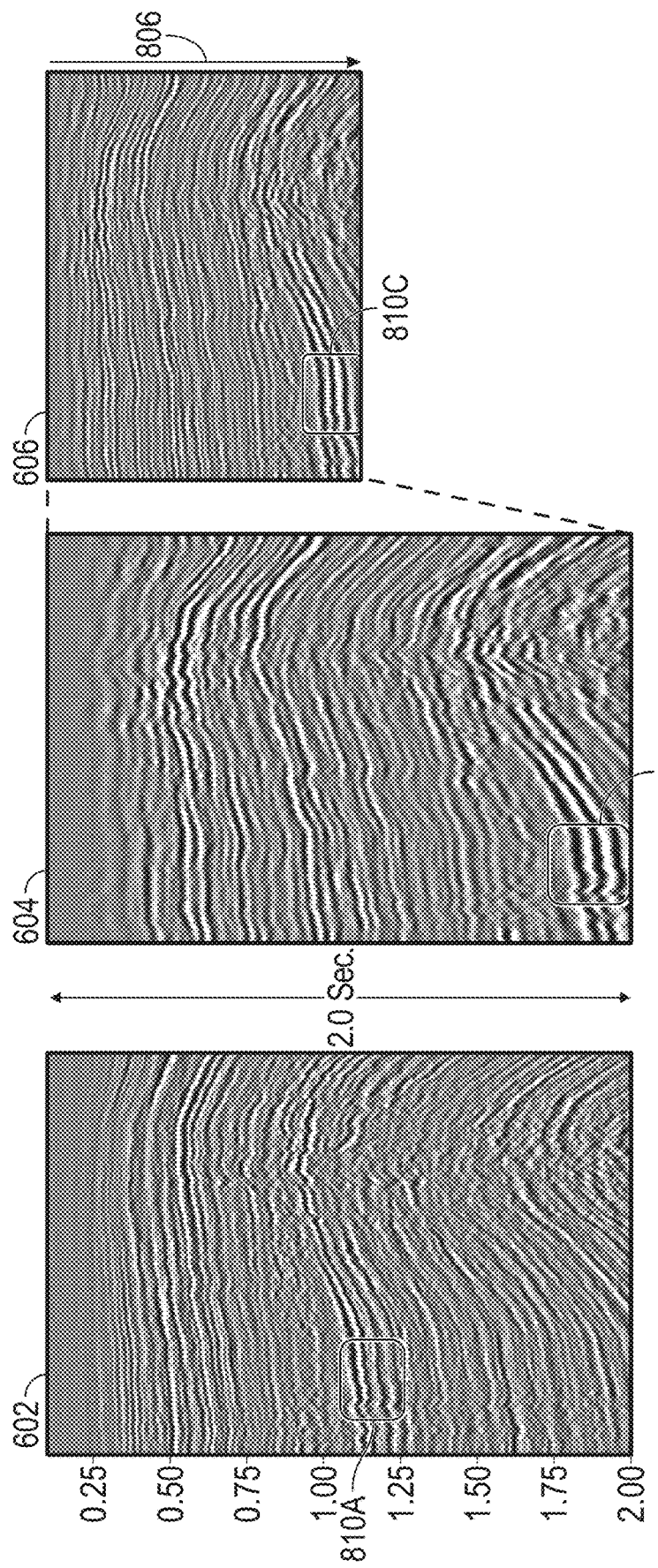
FIGS. 8A-8C show time-domain stacked seismic sections in accordance with one or more embodiments.

In Step 1108, the time-axis of at least one of the PP stacked time-domain seismic image (602) and the PS stacked time-domain seismic image (604) may be transformed to obtain a pair of coarsely-registered PP and PS seismic images (602, 606). The transformation may involve the compression of the travel time axis of the PS stacked time-domain seismic image (604), or the extension of the PP stacked time-domain seismic image (602). The transformation may be a compression, or an expansion of the travel time axes of both the PP stacked time-domain seismic image (602) and PS stacked time-domain seismic image (604). The transformation of the travel time axis of at least one of the PP stacked time-domain seismic image (602) and PS stacked time-domain seismic image (604) may approximately align the travel times of the reflected PP-waves (110) and the converted PS-waves (112). An example of this alignment (810A and 810C) is shown in FIG. 8.

In Step 1110, at least one of the pair of coarsely-registered PP and PS seismic images (602, 606) may be filtered to produce a pair of spectrally-matched PP and PS seismic images. The pair of spectrally-matched PP and PS seismic images may have amplitude and phase spectra approximately equal to one another.

In Step 1112, at least one of the pair of spectrally-matched PP and PS seismic images may be dynamically warped to produce a pair of fully-registered PP and PS seismic images (902, 908). The pair of fully-registered PP and PS seismic images (902, 908) may have well aligned travel times of the reflected PP-waves (110) and the converted PS-waves (112). FIG. 9 shows an example of this alignment (910A and 910D).

In Step 1114, the presence of a hydrocarbon reservoir may be detected based, at least in part, on at seismic attribute map derived from the pair of fully-registered PP and PS seismic images. For example, in one or more embodiment, the borehole path may be planned to traverse subterranean regions with high amplitudes in the PS member of the pair of fully-registered PP and PS seismic images (902, 908), but with low amplitudes in the PP member of the pair of fully-registered PP and PS seismic images (902, 908). In accordance with other embodiments, the borehole path may be planned to traverse subterranean regions with high amplitudes in both members of the pair of fully-registered PP and PS seismic images (902, 908). A borehole path through the subterranean region of interest may be determined based, at least in part, on the pair of fully-registered PP and PS seismic images (902, 908).

Figures 12A, 12B:
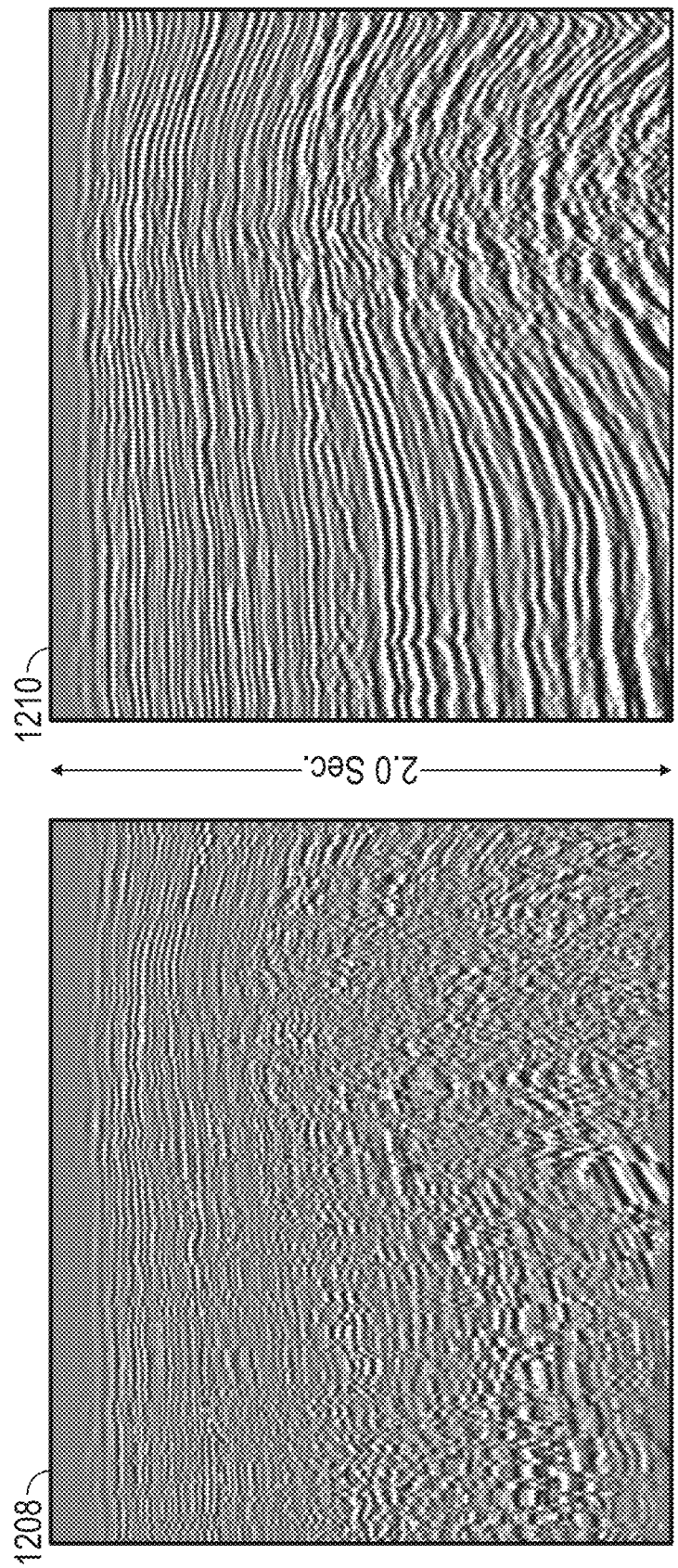
FIGS. 12A and 12B show time-domain stacked seismic sections in accordance with one or more embodiments.

FIGS. 12A and 12B shows, in accordance with one or more embodiments, a comparison of fully-registered PS seismic images (1210) applying the workflow depicted in FIG. 11 and the result (1208) of applying dynamic warping alone directly to the PS stacked time-domain seismic image (604). The improvement in continuity and consistency of the converted seismic PS-waves (1210) over the result of applying dynamic warping alone (1208) directly to the PS stacked time-domain seismic image (604) is clear to one of ordinary skill in the art. As a result of the improvement in continuity and consistency of the converted seismic PS-waves demonstrated in FIGS. 12A and 12B, the pair of fully-registered PP and PS seismic images (902, 908) may be used in the planning and performing a borehole path.

Figure 13:
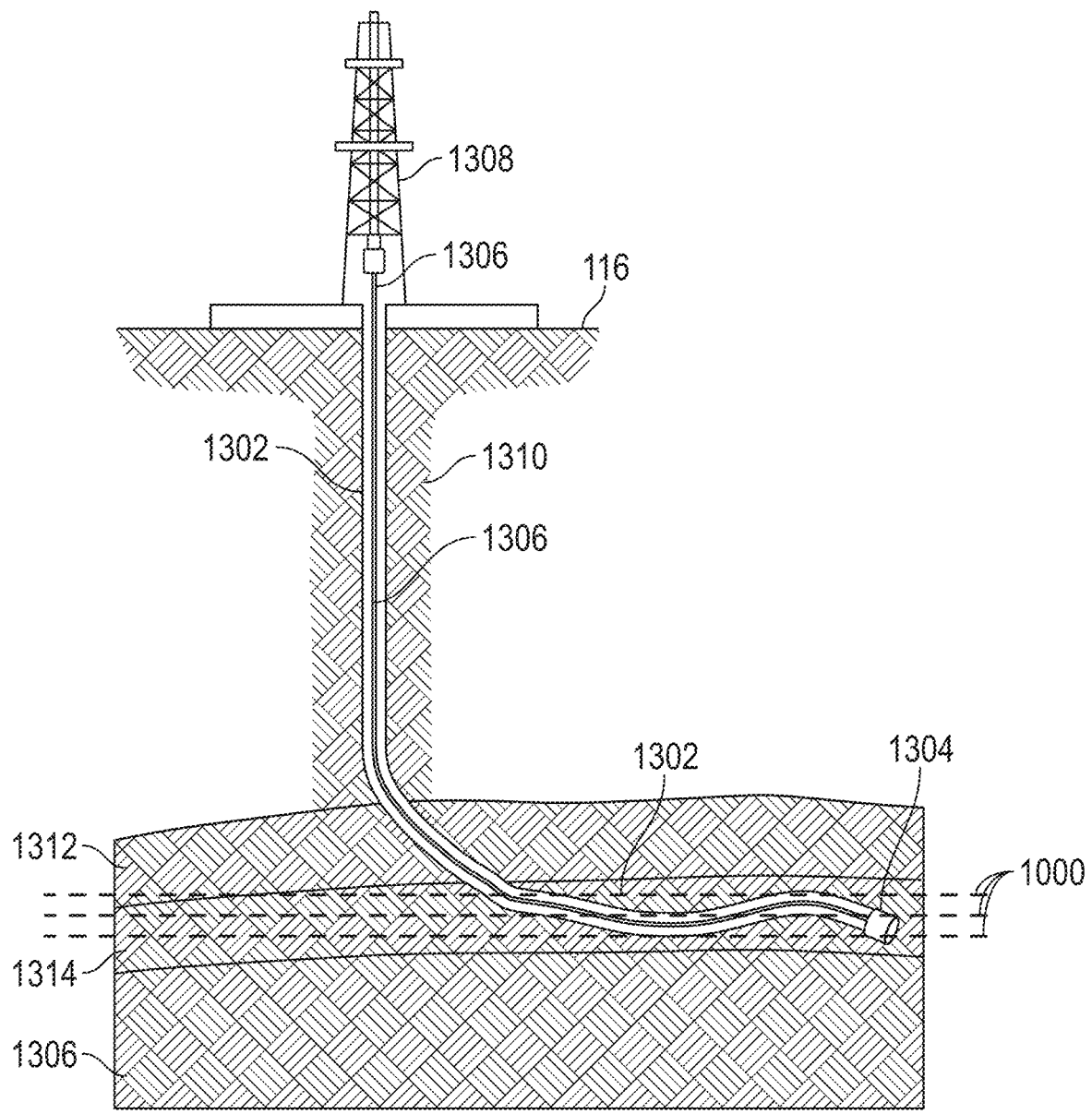
FIG. 13 shows systems in accordance with one or more embodiments.

FIG. 13 illustrates systems in accordance with one or more embodiments. As shown in FIG. 13, a borehole (1302) may be drilled by a drill bit (1304) attached by a drillstring (1306) to a drill rig (1308) located on the Earth's surface (116). The borehole may traverse a plurality of overburden layers (1310) and one or more cap-rock layers (1312) to a hydrocarbon reservoir (1314). A seismic attribute map (1000) corresponding to at least one depth may be used to plan and perform the curved borehole path (1306). A plurality of seismic attribute maps (1000) may be used to plan and perform a curve borehole path that intersects a plurality of regions thought to have high probability of containing hydrocarbons.

Figure 14:
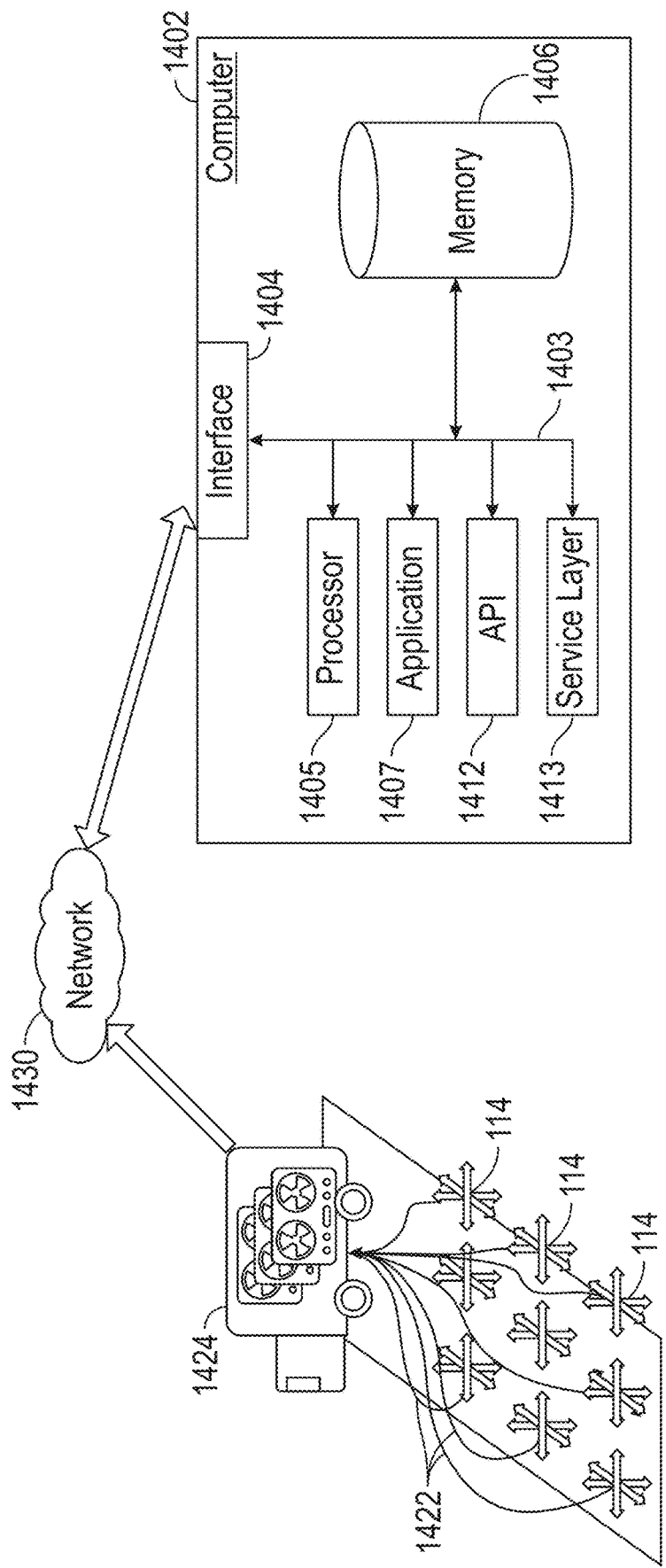
FIG. 14 shows systems in accordance with one or more embodiments.

FIG. 14 shows a seismic recording and processing system, in accordance with one or more embodiments. The data recorded by a plurality of multicomponent seismic receivers (114) may be transmitted to a seismic recording facility (1424) located in the neighborhood of the seismic survey (100). The seismic recording facility may be one or more seismic recording trucks (1424). The plurality of seismic receivers (114) may be in digitally or analogic telecommunication with the seismic recording facility (1424). The telecommunication may be performed over telemetry channels (1422) that may be electrical cables, such as coaxial cables, or may be performed wireless using wireless systems, such as Wi-Fi or Bluetooth. Digitization of the seismic data may be performed at each multicomponent seismic receiver (114), or at the seismic recording facility (1424), or at an intermediate telemetry node (not shown) between the multicomponent seismic receiver (114) and the seismic recording facility (1424).

The seismic data may be recorded at the seismic recording facility (1424) and stored on non-transitory computer memory. The computer memory may be one or more computer hard-drives, or one or more computer memory tapes, or any other convenient computer memory media familiar to one skilled in the art. The seismic data may be transmitted to a computer (1402) for processing. The computer (1402) may be located in or near the seismic recording facility (1424) or may be located at a remote location, that may be in another city, country, or continent. The seismic data may be transmitted from the seismic recording facility (1424) to a computer (1402) for processing. The transmission may occur over a network (1430) that may be a local area network using an ethernet or Wi-Fi system, or alternatively the network (1430) may be a wide area network using an internet or intranet service. Alternatively, seismic data may be transmitted over a network (1430) using satellite communication networks. Most commonly, because of its size, seismic data may be transmitted by physically transporting the computer memory, such as computer tapes or hard drives, in which the seismic data is stored from the seismic recording facility (1402) to the location of the computer (1402) to be used for processing.

FIG. 14 further depicts a block diagram of a computer system (1402) used to provide computational functionalities associated with described algorithms, methods, functions, processes, flows, and procedures as described in this disclosure, according to one or more embodiments. The illustrated computer (1402) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1402) may include a computer that includes an input device, such as a keypad, keyboard, touch screen, or other device that can accept user information, and an output device that conveys information associated with the operation of the computer (1402), including digital data, visual, or audio information (or a combination of information), or a GUI.

The computer (1402) can serve in a role as a client, network component, a server, a database or other persistency, or any other component (or a combination of roles) of a computer system for performing the subject matter described in the instant disclosure. The illustrated computer (1402) is communicably coupled with a network (1430). In some implementations, one or more components of the computer (1402) may be configured to operate within environments, including cloud-computing-based, local, global, or other environment (or a combination of environments).

At a high level, the computer (1402) is an electronic computing device operable to receive, transmit, process, store, or manage data and information associated with the described subject matter. According to some implementations, the computer (1402) may also include or be communicably coupled with an application server, e-mail server, web server, caching server, streaming data server, business intelligence (BI) server, or other server (or a combination of servers).

The computer (1402) can receive requests over network (1430) from a client application (for example, executing on another computer (1402)) and responding to the received requests by processing the said requests in an appropriate software application. In addition, requests may also be sent to the computer (1402) from internal users (for example, from a command console or by other appropriate access method), external or third-parties, other automated applications, as well as any other appropriate entities, individuals, systems, or computers.

Each of the components of the computer (1402) can communicate using a system bus (1403). In some implementations, any or all of the components of the computer (1402), both hardware or software (or a combination of hardware and software), may interface with each other or the interface (1404) (or a combination of both) over the system bus (1403) using an application programming interface (API) (1412) or a service layer (1413) (or a combination of the API (1412) and service layer (1413). The API (1412) may include specifications for routines, data structures, and object classes. The API (1412) may be either computer-language independent or dependent and refer to a complete interface, a single function, or even a set of APIs. The service layer (1413) provides software services to the computer (1402) or other components (whether or not illustrated) that are communicably coupled to the computer (1402). The functionality of the computer (1402) may be accessible for all service consumers using this service layer. Software services, such as those provided by the service layer (1413), provide reusable, defined business functionalities through a defined interface. For example, the interface may be software written in JAVA, C++, or other suitable language providing data in extensible markup language (XML) format or other suitable format. While illustrated as an integrated component of the computer (1402), alternative implementations may illustrate the API (1412) or the service layer (1413) as stand-alone components in relation to other components of the computer (1402) or other components (whether or not illustrated) that are communicably coupled to the computer (1402). Moreover, any or all parts of the API (1412) or the service layer (1413) may be implemented as child or sub-modules of another software module, enterprise application, or hardware module without departing from the scope of this disclosure.

The computer (1402) includes an interface (1404). Although illustrated as a single interface (1404) in FIG. 14, two or more interfaces (1404) may be used according to particular needs, desires, or particular implementations of the computer (1402). The interface (1404) is used by the computer (1402) for communicating with other systems in a distributed environment that are connected to the network (1430). Generally, the interface (1404 includes logic encoded in software or hardware (or a combination of software and hardware) and operable to communicate with the network (1430). More specifically, the interface (1404) may include software supporting one or more communication protocols associated with communications such that the network (1430) or interface's hardware is operable to communicate physical signals within and outside of the illustrated computer (1402).

The computer (1402) includes at least one computer processor (1405). Although illustrated as a single computer processor (1405) in FIG. 14, two or more processors may be used according to particular needs, desires, or particular implementations of the computer (1402). Generally, the computer processor (1405) executes instructions and manipulates data to perform the operations of the computer (1402) and any algorithms, methods, functions, processes, flows, and procedures as described in the instant disclosure.

The computer (1402) also includes a memory (1406) that holds data for the computer (1402) or other components (or a combination of both) that can be connected to the network (1430). For example, memory (1406) can be a database storing data consistent with this disclosure. Although illustrated as a single memory (1406) in FIG. 14, two or more memories may be used according to particular needs, desires, or particular implementations of the computer (1402) and the described functionality. While memory (1406) is illustrated as an integral component of the computer (1402), in alternative implementations, memory (1406) can be external to the computer (1402).

The application (1407) is an algorithmic software engine providing functionality according to particular needs, desires, or particular implementations of the computer (1402), particularly with respect to functionality described in this disclosure. For example, application (1407) can serve as one or more components, modules, applications, etc. Further, although illustrated as a single application (1407), the application (1407) may be implemented as multiple applications (1407) on the computer (1402). In addition, although illustrated as integral to the computer (1402), in alternative implementations, the application (1407) can be external to the computer (1402).

There may be any number of computers (1402) associated with, or external to, a computer system containing computer (1402), wherein each computer (1402) communicates over network (1430). Further, the term "client," "user," and other appropriate terminology may be used interchangeably as appropriate without departing from the scope of this disclosure. Moreover, this disclosure contemplates that many users may use one computer (1402), or that one user may use multiple computers (1402).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method, comprising:
    obtaining a multicomponent seismic data set for a subterranean region of interest;
    determining, using a computer processor, a PP stacked time-domain seismic image and a PS stacked time-domain seismic image from the multicomponent seismic data set;
    transforming, by the computer processor, a recording-time axis of at least one of the PP stacked time-domain seismic image and the PS stacked time-domain seismic image to produce a pair of coarsely-registered PP and PS seismic images;
    filtering, by the computer processor, at least one of the pair of coarsely-registered PP and PS seismic images to produce a pair of spectrally-matched PP and PS seismic images; and
    dynamically warping, by the computer processor, at least one of the pair of spectrally-matched PP and PS seismic images to produce a pair of fully-registered PP and PS seismic images.

2. The method of claim 1, further comprising:
    determining, by the computer processor, presence of a hydrocarbon reservoir based on at least one of the pair of fully-registered PP and PS seismic images.

3. The method of claim 2, further comprising:
    determining, by the computer processor, a borehole path through the subterranean region of interest based, at least in part, on the presence of the hydrocarbon reservoir; and
    performing the borehole path using a drilling system.

4. The method of claim 1, wherein obtaining the multicomponent seismic data set comprises using a plurality of seismic receivers that detect ground motion in first direction perpendicular to a surface direction and in a second direction orthogonal to the first direction.

5. The method of claim 4,
    wherein the PP stacked time-domain seismic image is determined from the detected ground motion in the first direction and the PS stacked time-domain seismic image is determined from the detected ground motion in the second direction.

6. The method of claim 1,
    wherein transforming the recording-time axis of at least one of the PP stacked time-domain seismic image and the PS stacked time-domain seismic image comprises calculating a ratio of a P-wave propagation speed to an S-wave propagation speed.

7. The method of claim 6,
    wherein at least one of the P-wave propagation speed and the S-wave propagation speed is determined by moveout correction velocity analysis.

8. The method of claim 1,
    wherein filtering at least one of the pair of coarsely-registered PP and PS seismic images comprises:
        determining a ratio of the non-stationary spectra of the PP member and the PS member of the pair of coarsely-registered PP and PS stacked time-domain seismic images, and
        normalizing at least one of the non-stationary spectra of the pair of coarsely-registered PP and PS stacked time-domain seismic images based, at least in part, on the ratio of the non-stationary spectra.

9. The method of claim 1,
    wherein dynamically warping comprises using a local cross-correlation method or a local image similarity attribute method.

10. A non-transitory computer readable medium storing instructions executable by a computer processor, the instructions comprising functionality for:
    obtaining a multicomponent seismic data set for a subterranean region of interest;
    determining a PP stacked time-domain seismic image and a PS stacked time-domain seismic image based, at least in part on the multicomponent seismic data set;
    transforming a recording-time axis of at least one of the PP stacked time-domain seismic image and the PS stacked time-domain seismic image to produce a pair of coarsely-registered PP and PS seismic images;
    filtering at least one of the pair of coarsely-registered PP and PS seismic images to produce a pair of spectrally-matched PP and PS seismic images; and
    dynamically warping at least one of the pair of spectrally-matched PP and PS seismic images, to produce a pair of fully-registered PP and PS seismic images.

11. The non-transitory computer readable medium of claim 10, further comprising:
    instructions for determining, the presence of a hydrocarbon reservoir based, at least in part, on at least one of the pair of fully-registered PP and PS seismic images.

12. The non-transitory computer readable medium of claim 11, further comprising:
    instructions for determining, a borehole path through the subterranean region of interest based, at least in part, on the presence of the hydrocarbon reservoir.

13. The non-transitory computer readable medium of claim 10, wherein the multicomponent seismic data set comprises:
    a seismic data set for the subterranean region of interest acquired by a plurality of seismic receivers that detect a ground motion in a vertical direction and detect a ground motion in at least one horizontal direction.

14. The non-transitory computer readable medium of claim 13,
    wherein the PP stacked time-domain seismic image is determined from the detected ground motion in a vertical direction, and the PS stacked time-domain seismic image is determined from the detected ground motion in at least one horizontal direction.

15. The non-transitory computer readable medium of claim 10,
    wherein transforming, the recording-time axis of at least one of the PP stacked time-domain seismic image and the PS stacked time-domain seismic image is based, at least in part on a ratio of a P-wave velocity to an S-wave velocity.

16. The non-transitory computer readable medium of claim 15,
wherein at least one of the P-wave propagation speed and the S-wave propagation speed is determined by moveout correction velocity analysis.

17. The non-transitory computer readable medium of claim 10,
wherein filtering, by the computer processor, at least one of the pair of coarsely-registered PP and PS seismic images to produce a pair of spectrally-matched PP and PS seismic images, comprises:
determining a ratio of the non-stationary spectra of the PP member and the PS member of the pair of coarsely-registered PP and PS stacked time-domain seismic images, and
normalizing at least one of the non-stationary spectra of the pair of coarsely-registered PP and PS stacked time-domain seismic images based, at least in part on the ratio of the non-stationary spectra.

18. The non-transitory computer readable medium of claim 10,
wherein dynamically warping is performed using a local cross-correlation method or a local image similarity attribute method.

19. A system for formation evaluation, comprising:
a seismic source to emit a radiated seismic P-waves;
a plurality of multicomponent seismic receivers for detecting and recording a multicomponent seismic data set generated by the radiated seismic P-waves; and
a seismic processor configured to:
determine a PP stacked time-domain seismic image and a PS stacked time-domain seismic image from the multicomponent seismic data set;
transform a recording-time axis of at least one of the PP stacked time-domain seismic image and the PS stacked time-domain seismic image to produce a pair of coarsely-registered PP and PS seismic images;
filter at least one of the pair of coarsely-registered PP and PS seismic images to produce a pair of spectrally-matched PP and PS seismic images; and
dynamically warp at least one of the pair of spectrally-matched PP and PS seismic images to produce a pair of fully-registered PP and PS seismic images.

20. The system for formation evaluation of claim 19,
wherein transforming, the recording-time axis of at least one of the PP stacked time-domain seismic image and the PS stacked time-domain seismic image is based, at least in part on a ratio of a P-wave velocity to an S-wave velocity.

* * * * *